United States Patent [19]

Holzel

[11] Patent Number: 5,178,010

[45] Date of Patent: Jan. 12, 1993

[54] CONTINUOUS GRAPHICAL DISPLAY OF BAROMETRIC DATA

[75] Inventor: Thomas M. Holzel, Concord, Mass.

[73] Assignee: Better Boating Association, Inc., Needham, Mass.

[21] Appl. No.: 541,149

[22] Filed: Jun. 20, 1990

[51] Int. Cl.[5] ............................................ G01W 1/00
[52] U.S. Cl. ...................................... 73/384; 346/21
[58] Field of Search ................. 73/384, 385, 386, 721, 73/723, 170 R; 346/21; 340/601

[56] References Cited

U.S. PATENT DOCUMENTS 4,631,960  12/1986  Wogerbauer ...................... 73/384

Primary Examiner—Donald O. Woodiel
Attorney, Agent, or Firm—Robert K. Tendler

[57] ABSTRACT

A continuous graphical display of barometric data includes an electronic trace of barometric pressure across a display in which the display including the trace, grid and axis labels are scrolled horizontally, with the display being updated from stored data on a continuous basis so that an entire week of uninterrupted barometric data can be presented, with preceding data being dropped off in a first in, first out scroll. Additionally a temporal history of temperature may be displayed as an electronic trace.

31 Claims, 3 Drawing Sheets

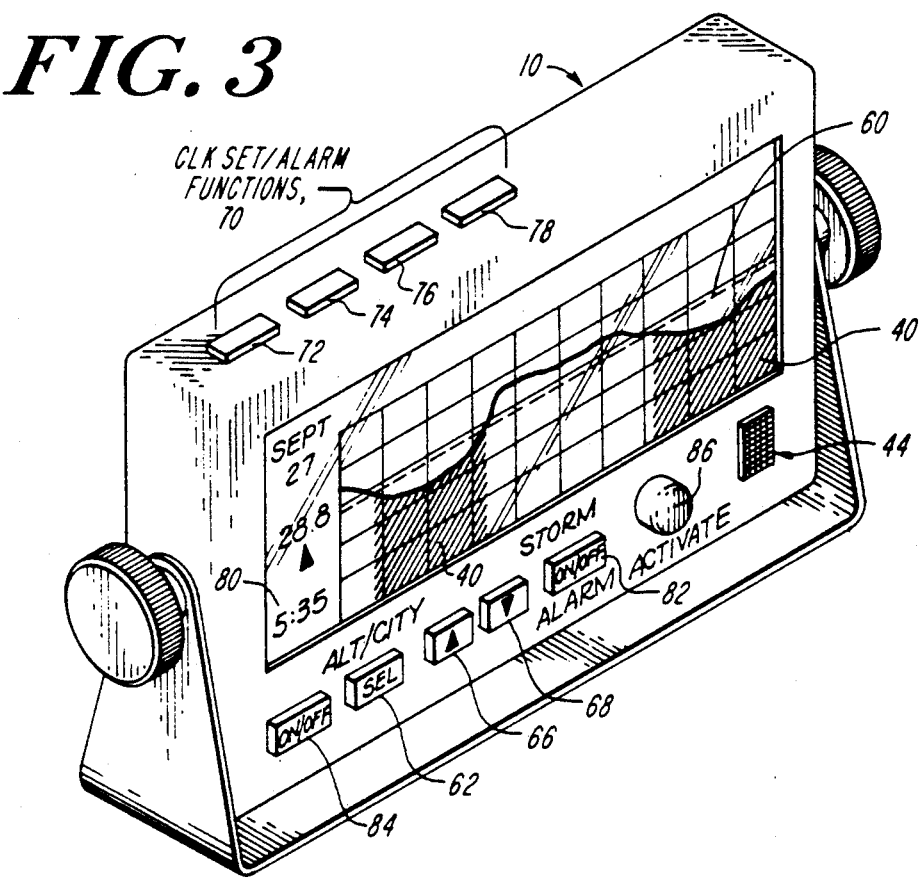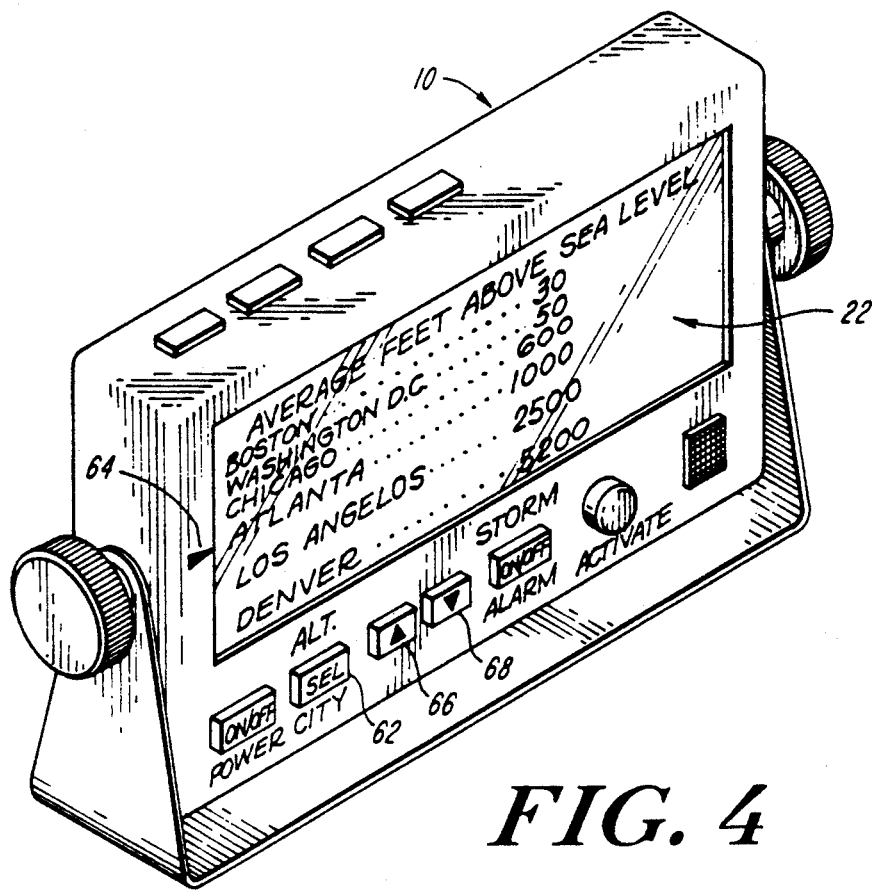

CONTINUOUS GRAPHICAL DISPLAY OF BAROMETRIC DATA

FIELD OF INVENTION

This invention relates to the display of barometric pressure more particularly to a continuously updated display of stored barometric pressure.

BACKGROUND OF THE INVENTION

As illustrated in U.S. Pat. Nos. 2,639,615; 2,997,879; 2,136,181; 1,484,815, and 1,481,986, barometric pressure has been displayed in the past through the utilization of a stylus adjacent a roll of paper, with the stylus providing an ink trace of the barometric pressure, or by the utilization of a thermosensitive paper and an appropriate stylus. Here there is relative movement between the stylus and the paper, with barometric readings recorded on a real-time basis without prior storage of the data.

One of the major problems with such displays is that they must be continuously reset and provided with either paper rolls, cylinders or the like; and/or provided with inking apparatus for the stylus utilized to record the barometric pressure.

Importantly, none of the prior barometers are capable of displaying continuous barometric information on a continuous first in, first out (FIFO) basis. Additionally, because these are real-time barometers with no stored data, there is no ability to alter the time span of data displayed on the chart; i.e. to "zoom" in on barometric information over a given time period. Moreover, as far as prior traces of barometric pressure, there is no separate indication on the display of a storm condition or, for instance, whether the barometric pressure is increasing or decreasing at the particular moment of measurement and display.

Moreover, there is no easy way to adjust such systems for the altitude of the barometer. For instance, should the display be a desk mounted display or wall mounted display, it is often times necessary to calibrate such devices by obtaining the barometric pressure at the location via a table or chart and then recalibrating the stylus to that point. This is both inconvenient and error prone.

On the other hand, were it possible merely to dial in the average altitude at the location or the city or town at which the barometer is located, then ease of calibration would be established. In the past, U.S. Pat. Nos. 1,485,152; 2,164,601; 2,609,691; 2,750,801; 2,953,024; 3,867,680, and 4,106,343 were devoted to calibration of altimeters which utilize barometric Pressure sensing means. However none of these calibration techniques are easily set and, in certain instances, require a sophisticated technician or mechanic. Also none are programmable.

Almost all pointer type barometers have a storm warning or indication on their dial. However, none apparently have an alarm or indicator which is actuated when a storm condition is present. In general, an impending storm or inclement weather is indicated if the barometric pressure drops below 29.92 inches at sea level, this indicates an impending storm. However the sensed barometric pressure must be adjusted for altitude if the device is to indicate with any accuracy the potential of an oncoming storm. Additionally, inclement weather is indicated when there is a pressure drop in excess of 0.05 inches per hour in barometric pressure, regardless of absolute pressure. Presently, no barometric pressure indicators for use in predicting weather utilize adjusted absolute barometric pressure thresholds to indicate storm conditions. Nor do they employ rate-of-change thresholds for storm indicating alarms. Note, U.S. Pat. Nos. 1,920,048; 2,853,393; 3,595,077, and 3,785,339 show systems which indicate inclement weather potential with or without an alarm function.

Note also, that clocks have been combined with barometers as illustrated in U.S. Pat. Nos. 2,510,402; 2,716,327; 3,157,985; 3,653,203, and 4,694,694. However, none of these patents describe a display with a continuously updated barometric pressure trace. Other U.S. Patents describing barometers and the display of atmospheric pressure are: U.S. Pat. Nos. 4,133,209; 4,010,646; 3,890,614; 3,852,711; 3,839,626; 3,829,640; 3,545,269; 3,333,565; 3,083,343; 3,079,799; 2,953,024; 2,703,932; 1,952,037; 1,848,053; 1,786,219; 1,534,306; 1,100,775, and 1,041,382.

SUMMARY OF THE INVENTION

It is therefore an object of the Subject Invention to provide a display of barometric pressure in analog or graphical form in which the display is in effect scrolled on a continuous basis from stored data such that an entire week, month, etc. of barometric pressure readings are stored and displayed at the convenience of the user on a first in, first out, FIFO basis. Thus, the barometric weather history of any user-selected time period can be stored and displayed, with the information being updated on a regular and continuous basis. The subject display has the ability to zoom in or select a particular time span. This results in the blowing up or magnification of the particular barometric pressure for that period. In so doing the user can have a ready time history of the barometric pressure over an extended period of time due to the electronic storage of the barometric pressure in memory, and with the pressure readout in analog form in a trace across a rectilinear screen. In one embodiment, the screen is provided with vertical grids (Y-axis) in accordance with the day of the week and time, and with a horizontal (X-axis) grid representing barometric pressure.

Impending inclement weather or storm conditions can be indicated in three ways with the subject display. First, from an absolute barometric pressure point of view, when the barometric pressure falls below for instance 29.92 inches of mercury, shading is graphically generated below the trace, with the shading indicating that a portion of the trace is below the above-mentioned threshold. Secondly, whenever the trace is below such a threshold, a visual storm indication warning may be displayed by any number of different types of indicia on the screen. This condition can also be annunciated with audible alarms, flashing lights, or other flashing indicia. Thirdly, an alarm condition can be sensed when the barometric pressure falls by an amount exceeding 0.05 inches of mercury per hour. In such a case an alarm is activated, with the alarm being either visible or audible. In one embodiment, this alarm condition may be displayed as shading above the trace.

In this manner merely looking at the display will indicate that a potential storm condition is either presently occurring or has occurred. It will also be immediately obvious from viewing the display how long or frequently storm conditions have occurred, i.e. their duration. Duration of inclement weather has not heretofore been displayed. Nor, has an audible or visible indication of an impending storm been provided when the time rate of change of the barometric pressure over, for instance, an hour exceeds a predetermined rate threshold, although instantaneously detecting rate of change of barometric Pressure is described in U.S. Pat. No. 2,718,783.

Additionally, current barometric pressure may be displayed, along with an arrow indicating whether the barometric pressure is rising or falling. Thus, one does not have to look at the analog indication of barometric pressure in order to ascertain the progress of the barometric pressure, and thus the possible approach or withdrawal of the inclement weather.

With respect to the alarm conditions based on absolute barometric pressure, a convenient method is provided for adjusting the indicated barometric pressure so as to correspond to the altitude of the barometer. It will be appreciated that if one chooses to indicate an impending storm condition as being the fall of the barometric pressure below 29.92 inches of mercury, then it is important that the local altitude be taken into consideration. In order to do this, in one embodiment, a scrolling display of either ascending altitudes or the associated cities is provided, with the user selecting the appropriate correction either by the altitude or by the city at which the unit is located. Once having been selected, the readings from the sensor are automatically adjusted for this altitude. Thus the subject system provides a convenient method of a one time altitude adjustment for the barometric display so as to appropriately set an absolute barometric threshold.

As mentioned hereinbefore, it is possible to magnify or display only a portion of the trace or record of barometric pressure. This is accomplished by expanding the horizontal scale of the display and can include interpolating between the points so as to provide a smooth curve. The subject system interpolates between measurements in one embodiment, or in another embodiment provides enough data points such that a smooth trace is obtained regardless of the degree of zoom or magnification provided by the system.

It will be appreciated that the subject display may be desk mounted, or may be wall mounted depending on the type of cabinet utilized. Moreover, the display may be wrist mounted and provided with a clock, if desired.

In summary, a continuous display barometer includes an electronic trace of barometric pressure across a display screen in which the display including the trace, grid and axis labels are scrolled horizontally, with the display being updated from stored data on a continuous basis so that any desired period of uninterrupted barometric data can be presented, with preceding data being dropped off in a first in, first out manner. Here the right hand edge of the display is made to indicate present barometric pressure, the display being scrolled to the left. An option of having only a selected portion of the week or day displayed is provided as a zoom feature. The continuous analog display of barometric pressure eliminates the problem of changing rolls or other recording medium to permit the display of more than a single days worth of barometric pressure for providing an elongated time history. In one embodiment, an arrow is provided for indicating whether or not the barometric pressure is rising or falling, with a further "storm condition" indication being provided by a shaded area beneath the trace representing barometric pressure when the barometric pressure falls below 29.92 inches of mercury. Additionally, in a further embodiment the display is provided with a visual indication of an impending storm, or an audible indication, when the time rate of change of the barometric pressure falls faster than 0.05 inches per hour. In a still further embodiment, the system is adjusted for height above sea level by providing a listing of cities and average altitudes and scrolling through the cities until the appropriate city is opposite a fixed cursor. The user then selects either the city or the altitude most closely approximating the local altitude. This in turn provides for automatic calibration of the barometer. In a yet further embodiment, time may also be displayed along with the day of the week. Additionally temperature may be stored and displayed in the same manner as barometric pressure.

BRIEF DESCRIPTION OF THE DRAWINGS

These and other features of the Subject Invention will be better understood taken in conjunction with the Detailed Description and the Drawings of which:

FIG. 3 is a diagrammatic illustration of the continuous display barometer of FIG. 1, illustrating an altitude selection system for compensating the barometric display, an alarm activation system, and a system for setting clock and alarm functions;

FIG. 4 is a diagrammatic illustration of the barometer of FIG. 3 illustrating the display in a altitude correction mode in which the city or altitude is scrolled by a fixed cursor, which when the appropriate altitude/city is adjacent the fixed cursor, the display is automatically compensated for height above sea level;

DETAILED DESCRIPTION

Figure 1:
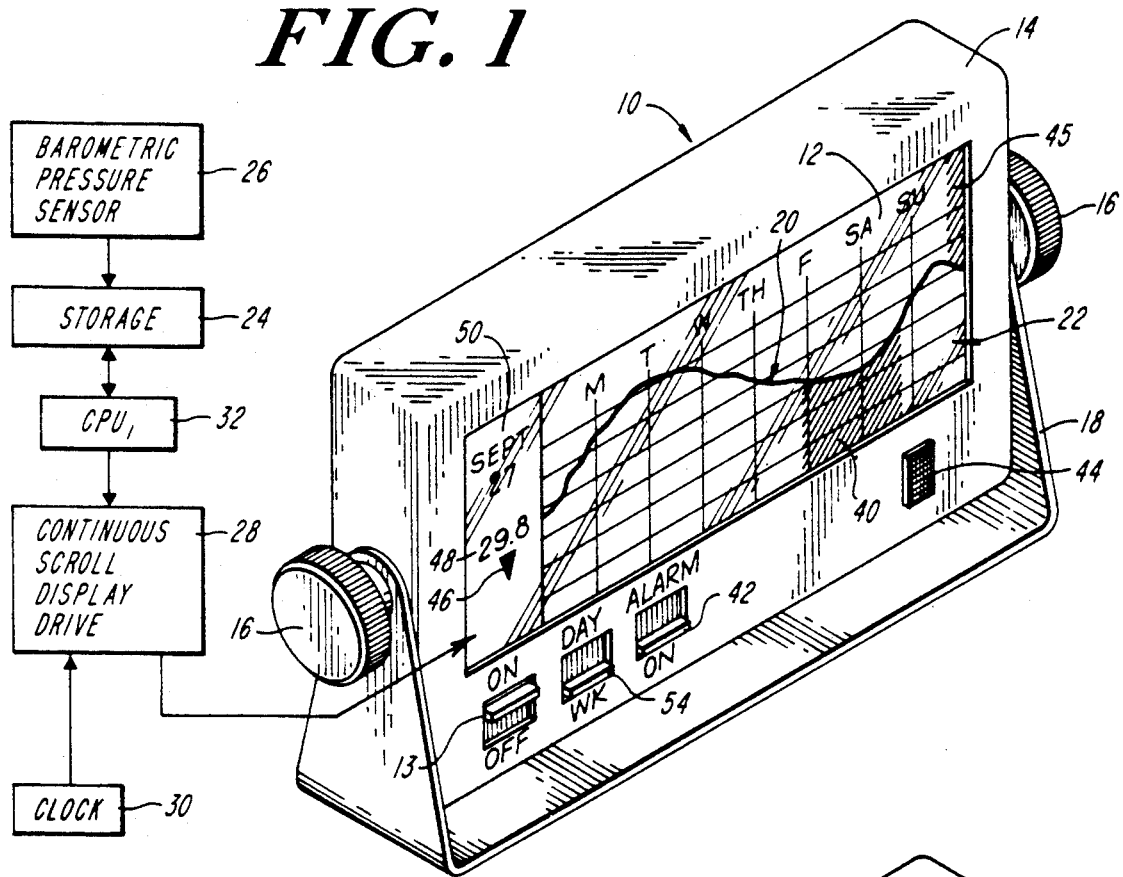
FIG. 1 is a diagrammatic view of the subject continuous reading barometer, illustrating the continuous trace and the continuous scroll flat panel display drive.

Referring now to FIG. 1, in one embodiment, a barometer 10 includes a flat panel display 12 having an ON/OFF switch 13, in which the display includes a cabinet or enclosure 14 that is gimbal mounted at 16 to a stand 18. The display includes a continuous trace 20 which runs in a horizontal direction from right to left across screen 22 in the illustrated embodiment. The display is driven by a continuous scroll display drive 24 which has as its input, the output of the barometric pressure sensor 26.

In one embodiment, the flat panel display is an LCD display with an electronically produced trace, the trace having been produced from barometric pressure measurements stored in memory or storage 28, with the output of storage 28 being clocked through continuous scroll display drive 24 by clock 30. In this manner the display may be refreshed in a first in, first out manner by updating the display so as to clock it from right to left at predetermined time intervals. Thus data is recorded with the most recent data to the right and aging data to the left.

As the data is scrolled from right to left, so too is the grid over which the trace is superimposed. The grid has vertical markings corresponding, in this case, to the days of the week, with the horizontal grid markings corresponding to barometric pressure in terms of inches of mercury. What will be appreciated is that the entire display is scrolled across the screen horizontally such that the screen portrays an extended history of the local barometric pressure. This is a temporal history as opposed to a spatial portrayal. Thus how much data is portrayed can be controlled by the drive, due to the storage of the barometric pressure data.

Additionally, because of the storage of the barometric data, it is also possible to visually indicate when the barometric pressure drops below 29.2 inches of mercury. This, as mentioned before, is that absolute barometric pressure level below which inclement weather is indicated. For this purpose the indicator may be in the form of a shaded area 40 which lies below that portion of trace 20 which exists below a 29.2 inch threshold. Thus, unlike prior indications of inclement weather, the subject time history allows one to view the length of time that the inclement weather condition occurred, as well as its existence. It will also be appreciated that this indication of inclement weather is keyed to an absolute barometric pressure measurement that must be connected for altitude above sea level.

As will be discussed, it is possible to indicate inclement weather when, rather than indicating when the barometric pressure decreases below a predetermined threshold, the rate of change of barometric pressure exceeds, for instance, 0.5 inches of mercury per hour. This being the case, with an alarm switch 42 in the ON position illustrated, when drive 24 senses a rapid pressure decrease such as noted above, an alarm indicator 44 may be activated. This alarm indicator may be either audio or visual and be made to sound or illuminate when the rate of change of pressure drop exceeds a predetermined limit. For instance, a shaded area 45 may be added to its display to indicate the severe pressure drop.

Additionally, display 22 may be provided with indicia 46 which indicates whether the present barometric pressure is rising or falling. Furthermore, the present barometric pressure can be digitally displayed as illustrated at 48, with the date being displayed as illustrated at 50.

Figure 2:
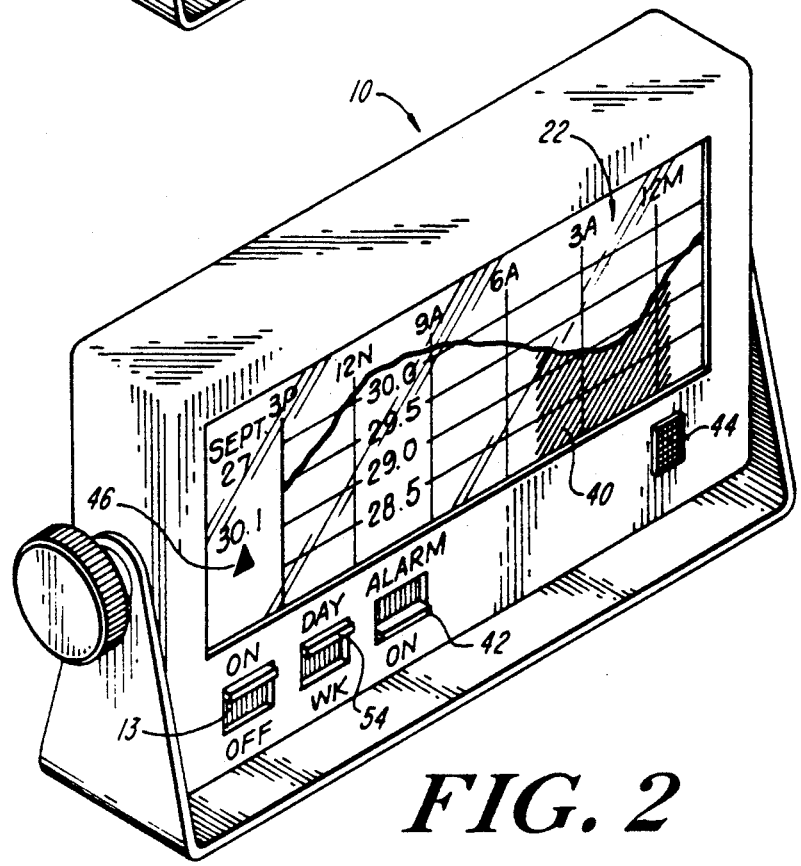
FIG. 2 is a diagrammatic illustration of the barometer of FIG. 1, illustrating a zoom feature in which a portion of the data displayed is selected and magnified.

What will be seen is that an entire week's worth of barometric pressure data can be displayed on a continuous basis with the most recent data added to the display at the right and with the oldest data being dropped off the display at the left. However, should it be desired to zoom in or blow up a predetermined portion of the barometric data, for instance as illustrated in FIG. 2, then a switch 54 can be switched from the position illustrated in FIG. 1 to the position illustrated in FIG. 2 so as to display only the most recent 15 hours worth of data. In this case, display 22 has vertical grid lines labeled in terms of hours of the day, as opposed to days of the week. It is because the barometric pressure is stored rather than being displayed on a real-time basis, that such a zoom feature can be achieved.

It will be noted that indicia 46 is in the form of an arrow pointing upwardly so as to indicate a pressure rise. Also the horizontal grid lines on display 22 may be labeled at a given location or window on the display to indicate barometric pressure.

Referring now to FIG. 3, it is possible to provide for the ability to adjust the threshold illustrated by dotted line 60 at which inclement weather indications 40 are indicated to compensate for the altitude of the barometer. It will be appreciated that if the alarm threshold indicated by line 60 is 29.92 inches of mercury, then it is important to adjust the barometer for its altitude above sea level. By entering in the altitude of the barometer, as will be described in connection with FIG. 4, the threshold associated with dotted line 60 can be appropriately adjusted. Note the 29.92 inch threshold is associated with sea level. However in a city such as Denver which is an average of 5,200 feet above sea level, the barometric pressure decrease associated with this altitude is subtracted from the threshold.

In order to conveniently enter the altitude of the barometer, a select button 62 is pressed to place barometer 10 in the display mode illustrated in FIG. 4. Here in ascending order of altitude, the cities of the United States are listed along with their altitude. At the left-hand side of the display is a fixed cursor 64 in the form of an arrow. The display is provided with UP/DOWN buttons 66 and 68 which serve to scroll the display 22 in the indicated direction such that one can control the city or altitude adjacent the fixed cursor. When the appropriate city or altitude is adjacent cursor 64, the select button 62 may be depressed so as to enter in the appropriate altitude correction for the barometer.

It will be noted that what is displayed is the average height of the barometer above sea level and that if the particular city or town is not displayed, then the user simply sets the cursor adjacent the average altitude at his or her location.

Referring back now to FIG. 3, clock/set and alarm functions 70 are entered via buttons 72-78 so as to be able to set the digital clock here illustrated at 80 and generally provide both alarm and wake up functions of a normal alarm clock. Here, alarm indicator 44 doubles as an audible wake up alarm. However, the storm alarm function is reestablished when button 82 is depressed.

The unit is provided with an ON/OFF power switch 84 and further includes an activation button 86, the purpose of which is to activate the display and alarm functions for only a limited period of time, such as, for instance, 10 seconds. This extends battery life when the barometer is operated in a portable battery-operated mode. Because of the storage of data, and because the display need not constantly be on, with its associated power drain, it is possible to battery operate the barometer over periods of weeks or months without undue power drain. It will be appreciated that the sensing and storage of barometric data requires very little in terms of power consumption, whereas the continuous display of the trace and the grid or coordinates can, in some instances, result in a power drain of 3/milliamps per hour for a display of 5 inches by 7 inches.

Figure 5:
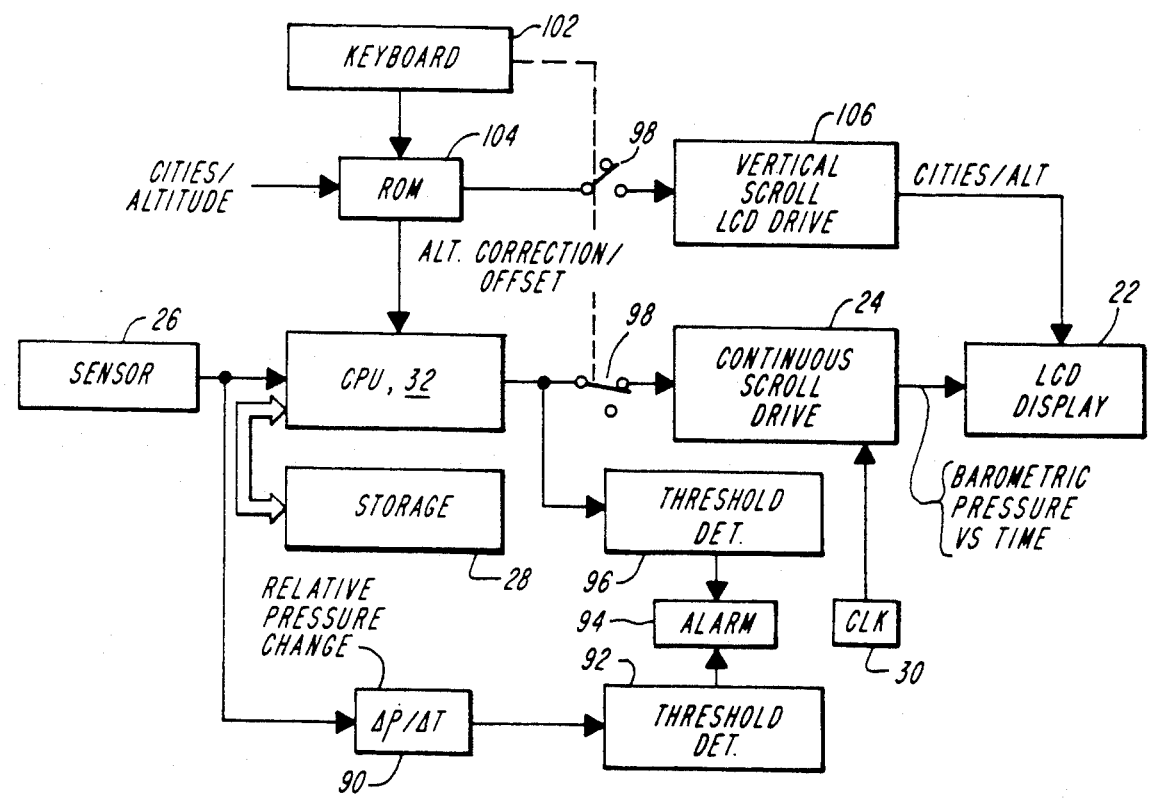
FIG. 5 is a schematic diagram of a control system for utilization in the barometer of FIGS. 3 and 4.

Referring now to FIG. 5, the barometric pressure sensor 26 is shown coupled to CPU 32 which transmits barometric pressure information to storage 28. Additionally, the unit is provided with a relative pressure change detector 90 which detects the rate of change, $\Delta P/\Delta T$, of barometric pressure. This rate change detector is applied to a threshold detection circuit 92 which recognizes when the rate of change of pressure exceeds 0.5 inches of mercury per hour in the negative direction. The output of threshold detector 92 is coupled to an alarm circuit 94 for indicating when the negative rate of change exceeds this threshold.

Alternatively, alarm 94 may be activated by a threshold detector 96 which detects when the sensed pressure exceeds a predetermined threshold, with the pressure coupled to the threshold detector 96 being adjusted for the altitude of the barometer.

The output of CPU 32 is the corrected barometric pressure that has been stored and is coupled to continuous scroll drive 24 through switch 98, with clock 30 being utilized to drive or clock the continuous scroll drive unit such that the barometric pressure output as well as the markings on the display are clocked across display 22 in the manner described.

With respect to altitude correction, a keyboard 102 is coupled to read only memory (ROM) 104 to which has been supplied cities and respective altitudes. Upon command from keyboard 102, ROM 104 is coupled through switch 98 to a vertical scroll drive unit 106 which outputs the cities and altitudes to display 22. In this mode of operation, the output of selected portions of ROM 104 are supplied to the display, with keyboard 102 being actuated to scroll the information in ROM 104 to display 22 on command. This can be accomplished through the above-mentioned UP/DOWN switches which can form a portion of the keyboard 102. Upon the appropriate scrolling of the display, and the selection of a particular altitude via a select button which is part of keyboard 102, ROM 104 outputs the corresponding altitude correction to CPU 32 so as to be quickly and efficiently compensate the barometer reading for height above sea level.

Figure 6:
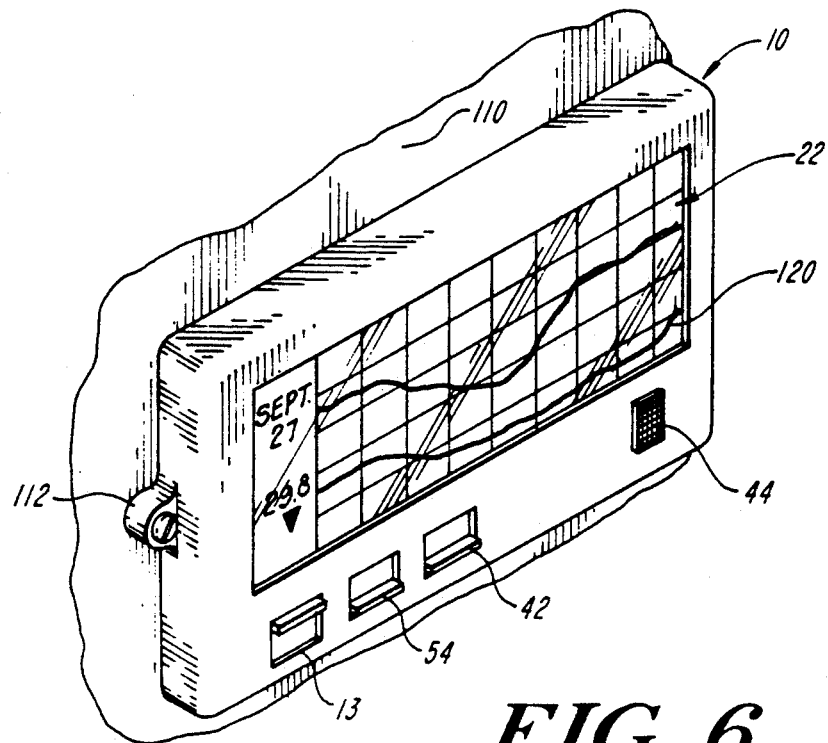
FIG. 6 is a diagrammatic illustration of a wall-mounted continuous display barometer.

Referring now to FIG. 6, the entire barometer 10 can be wall mounted to a wall 110 via apertured ears or integral extensions 112 such that, as a convenient method for mounting the barometer on a bulkhead, the barometer need only be physically attached via these apertured members to a vertically rising surface. Moreover, as shown by trace 120, temperature can be displayed with barometric pressure. Alternatively either can be displayed separately.

Having above indicated a preferred embodiment of the present invention, it will occur to those skilled in the art that modifications and alternatives can be practiced within the spirit of the invention. It is accordingly intended to define the scope of the invention only as indicated in the following claims:

I claim:

1. A continuous graphical display barometer comprising:
   means for sensing and storing barometric pressure;
   an electronically driven display having a predetermined size and scale; and
   means coupled to said sensing and storing means for driving said display so as to provide a trace of the sensed and stored barometric pressure in a first in, first out fashion, such that the trace is continuously updated, the length of the time history of displayed barometric pressure data being dictated by the size and scale of said display.

2. The barometer of claim 1 wherein said driving means includes means coupled to said sensing and storing means for selectively enlarging a portion of the displayed data so as to portray a greater or smaller time history of barometric data.

3. The barometer of claim 1 and further including inclement weather sensing means coupled to said sensing and storing means for sensing a barometric condition indicating inclement weather and for indicating said alarm condition on said display.

4. The barometer of claim 3 wherein said inclement weather sensing means includes alarm threshold detection means coupled to said sensing and storing means for proving an output whenever the absolute barometric pressure falls below a predetermined barometric pressure threshold.

5. The barometer of claim 4 wherein said inclement weather sensing means includes means coupled to said driving means for providing a distinctive area to one side of that portion of said trace which lies below said predetermined barometric pressure threshold.

6. The barometer of claim 4 and further including means for adjusting said barometric pressure threshold for the pressure difference between that associated with the local altitude and that associated with sea level.

7. The barometer of claim 6 and further including means associated with said sensing and storing means for storing the altitudes associated with various locales, means coupled to said driving means for providing an indication of said altitudes on said screen and means for selecting an altitude and for adjusting said barometric pressure threshold in accordance with the selected altitude.

8. The barometer of claim 7 wherein said altitude selecting means includes a cursor positioned opposite an altitude.

9. The barometer of claim 8 wherein said cursor is fixed and wherein said altitude selecting means includes means for scrolling said indication of altitude past said fixed cursor.

10. The barometer of claim 7 wherein said means for storing and dispaying altitudes includes means for storing and displaying a descriptor for the associated locale adjacent the associated altitude for the locale.

11. The barometer of claim 1 and further including means coupled to said sensing and storing means for sensing a predetermined rate of decrease of barometric pressure and for providing an alarm condition signal indicating when the rate of barometric pressure decrease exceeds a predetermined threshold.

12. The barometer of claim 11 and further including means coupled to said driving means for providing a distinctive marking to one side of said trace responsive to the provision of said alarm condition signal.

13. The barometer of claim 1 and further including means for adjusting the sensed and stored data for the pressure difference between that associated with the local altitude and that associated with sea level.

14. The barometer of claim 1 wherein said display includes an LCD type display.

15. The barometer of claim 1 wherein said display includes a cathode ray tube type display.

16. The barometer of claim 1 wherein said barometer includes a thin, wall-mountable case.

17. The barometer of claim 1 wherein said driving means includes means for providing graph lines which travel across said display with said trace.

18. The barometer of claim 17 wherein said graph lines include vertical time lines.

19. The barometer of claim 17 wherein said graph lines include vertical time lines.

20. The barometer of claim 18 wherein said graph lines include at least one horizontal barometric pressure line.

21. The barometer of claim 1 and further including means at said display for graphically indicating whether barometric pressure is rising or falling.

22. The barometer of claim 21 wherein means for graphically indicating whether said barometric pressure is rising or falling includes an arrow indicating by its direction whether barometric pressure is rising or falling.

23. The barometer of claim 1 wherein said barometer is battery operated and further including means for selectively disabling all but said sensing and storing means, thereby to selectively disable said flat pannel display and driving means for limiting power consumption.

24. A graphical display barometer comprising:
means for sensing and storing barometric pressure; an electronically driven display having a predetermined size and scale; and,
means coupled to said sensing and storing means for driving said display so as to electronically provide a graphical time history of the sensed and stored barometric pressure such that the time history is periodically updated, the extent of the time history of displayed barometric pressure data being dictated by the size and scale of said display.

25. The barometer of claim 24 wherein said display is a flat pannel display.

26. The barometer of claim 24 wherein said display includes a cathode ray tube.

27. A continuous graphical display barometer comprising:
means for sensing and storing barometric pressure;
an electronically driven display having a predetermined size and scale; and,
means coupled to said sensing and storing means for driving said display so as to provide a trace of the sensed and stored barometric pressure in a first in, first out fashion, such that the traces continuously updated, the length of the time history of displayed barometric pressure data being dictated by the size and scale of said display, said driving means including means for providing multiple graph lines which travel across said display with said trace.

28. the barometer of claim 27 wherein said graph lines include at least one horizontal barometric pressure line.

29. The barometer of claim 27 and further including means at said display for graphically indicating whether barometric pressure is rising or falling.

30. The barometer of claim 29 wherein said means for graphically indicating whether said barometric pressure is rising or falling includes an arrow indicating by its direction whether barometric pressure is rising or fallling.

31. The barometer of claim 27 wherein said barometer is battery operated and further including means for selectively disabling all but said sensing and storing means, thereby to selectively disable said display and driving means for limiting power consumption.

* * * * *